United States Patent

Beffa

[11] 4,314,937
[45] Feb. 9, 1982

[54] 1:2 CHROMIUM UNSYMMETRICAL COMPLEXES OF AZO AND DISAZO DYES

[75] Inventor: Fabio Beffa, Riehen, Switzerland

[73] Assignee: Ciba-Geigy Corporation, Ardsley, N.Y.

[21] Appl. No.: 128,228

[22] Filed: Mar. 7, 1980

Related U.S. Application Data

[63] Continuation-in-part of Ser. No. 924,316, Jul. 13, 1978, abandoned, which is a continuation of Ser. No. 762,062, Jan. 24, 1977, abandoned.

[30] Foreign Application Priority Data

Feb. 4, 1976 [CH] Switzerland ............... 1356/76

[51] Int. Cl.³ ............... C09B 45/06; C09B 45/26; C09B 45/48; D06P 3/32
[52] U.S. Cl. ............... 260/145 A; 8/639; 260/148; 260/150; 260/187; 260/190; 260/191; 260/197
[58] Field of Search ............... 260/145 A, 145 B

[56] References Cited

U.S. PATENT DOCUMENTS

| | | | |
|---|---|---|---|
| 2,933,489 | 4/1960 | Biedermann et al. | 260/145 A |
| 3,398,132 | 8/1968 | Dehnert | 260/145 A |
| 3,576,771 | 9/1973 | Beffa | 260/145 A X |

Primary Examiner—Floyd D. Higel
Attorney, Agent, or Firm—Edward McC. Roberts

[57] ABSTRACT

Chromium complex dyes of the formula

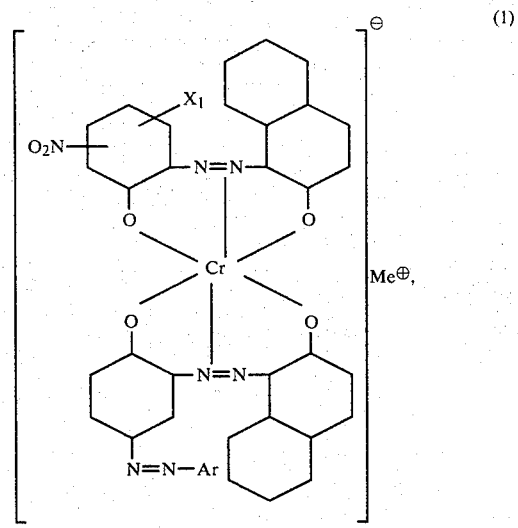

wherein
represents a halogen atom, a $C_1$–$C_5$-alkyl group, a $C_1$–$C_2$-alkoxy group, a nitro group, a $C_2$–$C_3$-alkanoylamino or $C_2$–$C_3$-alkoxycarbonylamino group,
Me⊕ represents a cation, and
Ar represents the radical of an aromatic or heterocyclic diazo component which carries one to three $SO_3H$ and/or COOH groups, preferably one to three $SO_3H$ groups or one $SO_3H$ and one COOH group, and is optionally further substituted by halogen, $C_1$–$C_5$-alkyl, $C_1$–$C_2$-alkoxy or nitro. These dyes are suitable for dyeing and printing nitrogen-containing material such as wool, silk, synthetic polyamide and especially leather.

3 Claims, No Drawings

1:2 CHROMIUM UNSYMMETRICAL COMPLEXES OF AZO AND DISAZO DYES

This is a continuation-in-part of application Ser. No. 924,316, filed on July 13, 1978, now abandoned, which in turn was a continuation of application Ser. No. 762,062, filed on Jan. 24, 1977, now abandoned.

The present invention provides chromium complex dyes of the formula

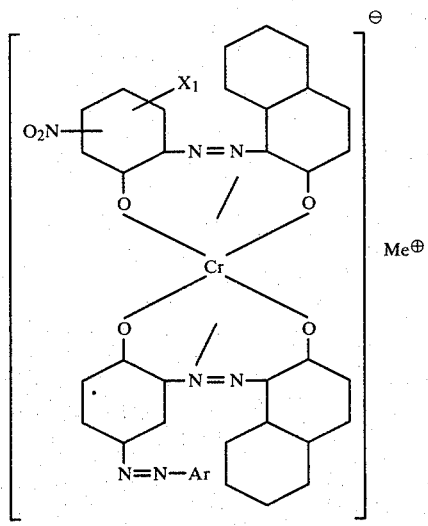

wherein $X_1$ represents a hydrogen or halogen atom, a $C_1$–$C_5$-alkyl group, a $C_1$–$C_2$-alkoxy group, a nitro group, a $C_2$–$C_3$-alkanoylamino or $C_2$–$C_3$-alkoxycarbonylamino group, Me⊕ represents a cation, and Ar represents the radical of an aromatic or heterocyclic diazo component which carries one to three $SO_3H$ and/or $COOH$ groups, preferably one to three $SO_3H$ groups or one $SO_3H$ and one $COOH$ group, and is optionally further substituted by halogen, $C_1$–$C_5$-alkyl, $C_1$–$C_2$-alkoxy or nitro.

Ar is primarily a naphthalene or benzene ring which carries 1 to 3, preferably 1 or 2, sulpho groups, and is optionally further substituted by chlorine, nitro, $C_1$–$C_5$-alkyl or $C_1$–$C_2$-alkoxy. The term "halogen" denotes herein fluorine and chiefly chlorine and bromine.

The novel dyes are obtained by reacting one of the azo dyes of the formula

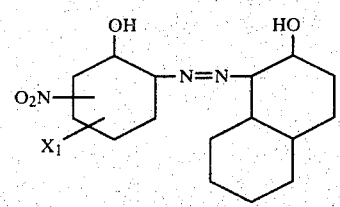

or a disazo dye of the formula

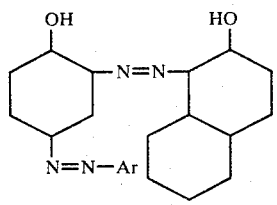

with a chromium donor to give the 1:1 chromium complex and subsequently reacting this latter with the non-metallised dye of the formula (3) or (2) to give the 1:2 complex. Preferably the 1:1 chromium complex of the monoazo dye of the formula (2) is prepared and then reacted with the disazo dye of the formula (3).

Instead of containing hydroxyl groups, the starting dyes of the formula (2) or (3) can also contain groups from which hydroxyl groups are formed during the chroming, for example low molecular acyloxy or alkoxy groups, in particular methoxy groups.

The monoazo dyes can be prepared in conventional manner by coupling a 1-hydroxy- or 1-alkoxy-2-aminonitrobenzene to β-naphthol. In preferred monoazo compounds of the formula (2), $X_1$ represents a hydrogen or chlorine atom, a nitro or methyl group.

The disazo dyes of the formula (3) are obtained by coupling for example the diazonium compound of an amine Ar—$NH_2$ with a 1-hydroxy-2-aminobenzene the amino group of which is protected by acylation. The azo dye obtained is then diazotised after liberation of the amino group by saponification and coupled to β-naphthol. Suitable arylamines of the formula Ar—$NH_2$ are for example: 2-, 3- or 4-sulphoaniline, aniline-2,4-disulphonic acid, anthranilsulphonic acid, 4-methyl-2- or -3-sulphoaniline, 4-chloro-3-sulphoaniline, 4-nitro-2-sulphoaniline, 4-methoxy-3-sulphoaniline, 2-naphthylamine-6,8-disulphonic acid, 1-naphthylamine-4-, -6- or -7-sulphonic acid, 1-naphthylamine-4,8-disulphonic acid, 1-naphthylamine-3,6,8-trisulphonic acid etc. Heterocyclic amines, such as 2-aminobenzthiazole, are also suitable.

The conversion of the azo dye of the formula (2) or (3) into the 1:1 chromium complex is carried out by conventional methods which are known per se, for example by reacting it in an acid medium with a salt of trivalent chromium, for example chromium formiate, chromium sulphate, chromium chloride hexahydrate or chromium fluoride, at boiling temperature or, if appropriate, at temperatures exceeding 100° C. Trivalent chromium can also be obtained in the reaction mixture from chromium (VI) compounds, for example chromate, by simultaneously adding a reducing agent. The metallising can be carried out in an aqueous, aqueous-organic or organic medium.

The reaction of the 1:1 chromium complex of the dye of formula (2) or (3) with a dye of the formula (3) or (2) is advantageously carried out in a neutral to weakly alkaline medium, in an open or closed apparatus, at elevated temperature, for example at temperatures between 50° and 120° C.

The process can be carried out in organic solvents, for example alcohols or ketones or in an aqueous solution, in which case, if appropriate, the addition of solvents, for example of alcohols, formamide etc., can promote the reaction. It is usually advisable to react as far as possible equivalent amounts of the chromium-containing 1:1 complex and of the metal-free dye, the molecular ratio between metal-free dye and 1:1 complex advantageously being at least 0.85:1 and at most 1:0.85.

The chromium-containing mixed complexes of the present invention which are obtained by the above process are isolated with advantage in the form of their salts, in particular their alkali, for example lithium, salts, above all, sodium salts, or also ammonium salts. They are suitable for dyeing and printing nitrogen-containing material such as wool, silk, synthetic polyamide material and, in particular, for dyeing leather. The dyes containing 1 to 2 sulpho groups are suitable above all for dyeing wool, silk and synthetic polyamide; and the leather dyes can contain 1 to 3 sulpho groups. Black or brownish-black shades of good covering power are obtained in all cases. The dyes give level dyeings with good fastness to light, washing, water, perspiration, alkali, acid, dry cleaning, diffusion, decatizing and rubbing. They reserve well fibres from cotton, viscose cellulose acetate, polyester and polyacrylonitrile. The novel dyes are also suitable for use in mixtures.

The following Examples illustrate the invention, the parts and percentages being by weight unless otherwise indicated.

EXAMPLE 1

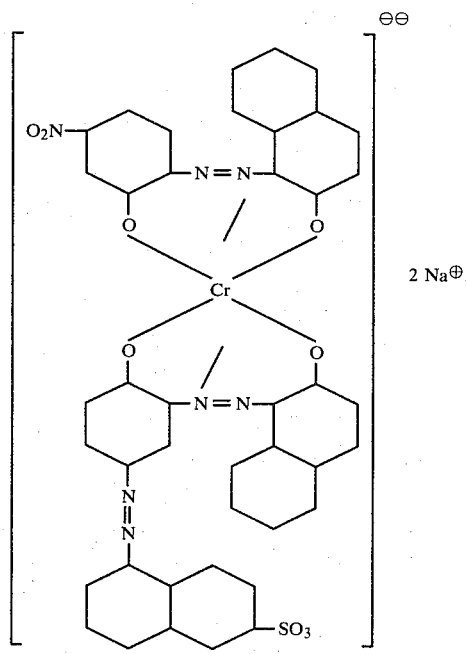

30.9 Parts of the monoazo dye obtained from diazotised 5-nitro-2-amino-1-hydroxybenzene and 2-hydroxynaphthalene are stirred with 26.65 parts of chromium chloride hexahydrate in 500 parts by volume of ethylene glycol at 120° to 125° C. until such time as the starting compound has disappeared. To the solution of the 1:1 chromium complex dye are then added 49.8 parts of the disazo dye obtained from diazotised 3-amino-4-hydroxyazobenzene-(1')-naphthalene-6'-sulphonic acid and 2-hydroxynaphthalene and 80 parts by volume of 20% sodium carbonate solution and the mixture is stirred for a further 1 to 2 hours at 80° to 85° C. to effect addition. When the reaction is complete, the asymmetric chromium-containing dye is precipitated by a saturated solution of sodium chloride, filtered off and dried. The product is a black solution and colours wool or polyamide material as well as leather in fast black shades from a weakly acid bath.

EXAMPLE 2

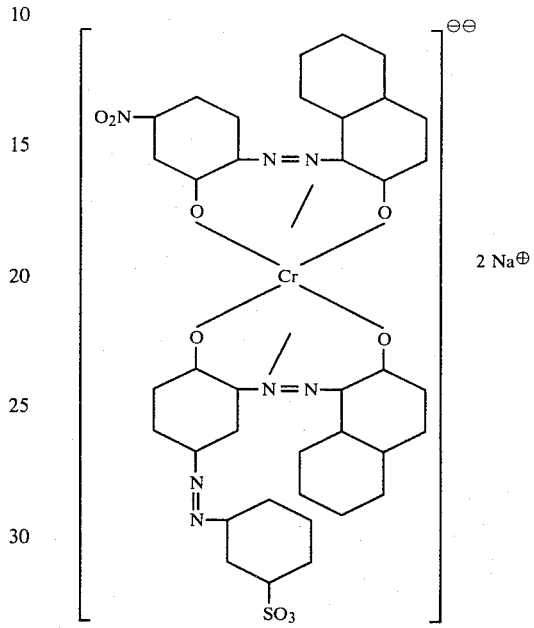

30.9 Parts of the monoazo dye obtained from diazotised 5-nitro-2-amino-1-hydroxybenzene and 2-hydroxynaphthalene are suspended in 300 parts by volume of n-butanol. After addition of 26.65 parts of chromium chloride hexahydrate, the mixture is stirred at 110° to 116° C. while the water which forms is separated as an azeotrope. The chroming is complete after approx. 3 to 4 hours. To the dye solution are then added 44.8 parts of the disazo dye obtained from diazotised 3-amino-4-hydroxyazobenzene-3'-sulphonic acid and 2-hydroxynaphthalene and 20 parts of calcined sodium carbonate. The batch is then stirred at 110° to 117° C. until the addition reaction is complete. The reaction mixture is subsequently filtered until clear and evaporated to dryness to yield a black powder which dissolves in water to and dyes wool or polyamide material from a neutral to weakly acid bath in black shades of good fastness properties.

EXAMPLE 3

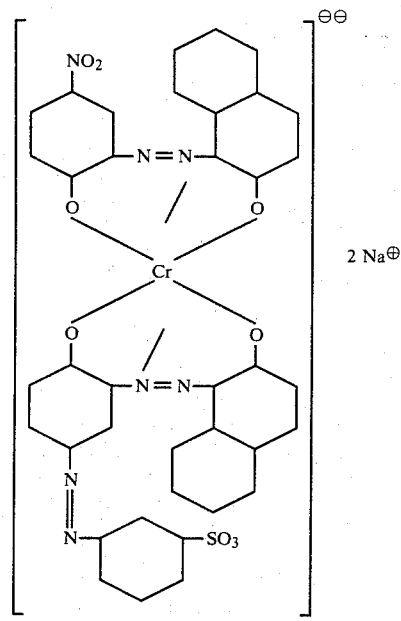

44.8 Parts of the disazo dye obtained from diazotised 3-amino-4-hydroxyazobenzene-3'-sulphonic acid and 2-hydroxynaphthalene are suspended in 400 parts by volume of n-butanol. After addition of 26.65 parts of chromium chloride hexahydrate, the mixture is stirred while the water which forms is separated as an azeotrope. The chroming is complete after approx. 3 to 4 hours. To the dye solution are then added 30.9 parts of the monoazo dye obtained from diazotised 4-nitro-2-amino-1-hydroxybenzene and 2-hydroxy-naphthalene and 20 parts of calcined sodium carbonate. The reaction mixture is then stirred until the addition reaction is complete, subsequently filtered until clear if necessary, and evaporated to dryness to yield a black powder which dissolves in water and colours leather, wool and polyamide material from a weakly acid bath in fast brownish-black shades of good fastness properties.

Black and brownish-black dyes with similar properties are obtained by reacting the mono- and disazo dyes as described in Examples 1 to 3 to give asymmetrical 1:2 chromium complexes.

-continued
| No. | Monoazo dye | Disazo dye |
|---|---|---|
| 5. | 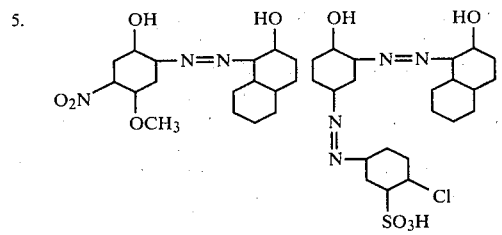 | |
| 6. | 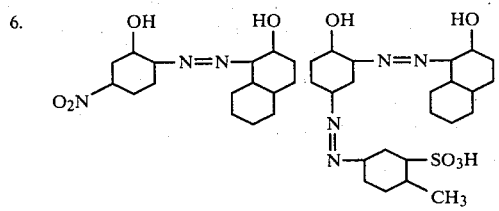 | |
| 7. | 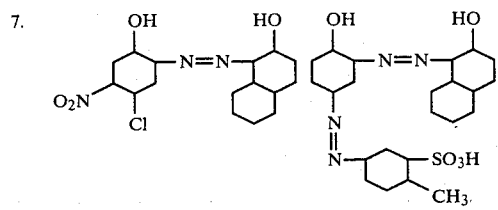 | |
| 8. | 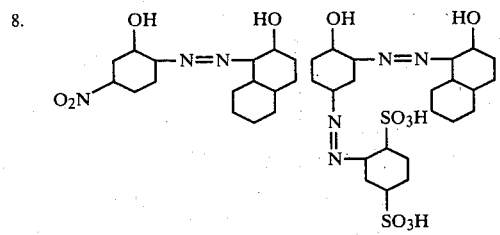 | |
| 9. | 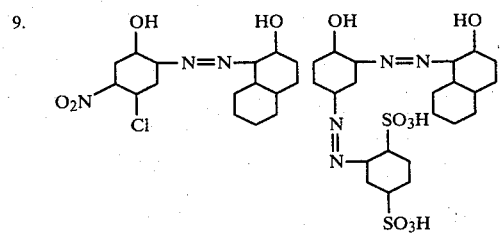 | |
| 10. | 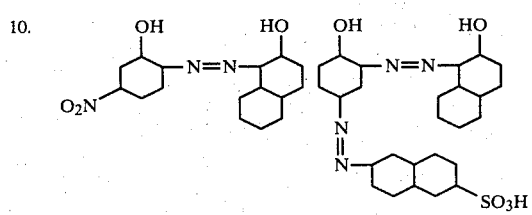 | |
| 11. | 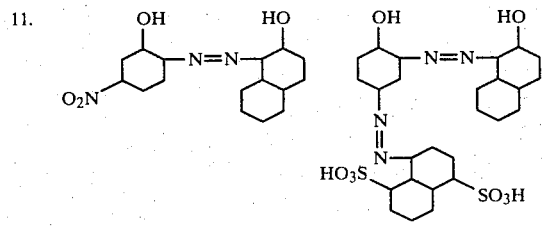 | |

| | | -continued | |
|---|---|---|---|
| No. | Monoazo dye | | Disazo dye |

(Table of chemical structures for entries 12 through 18, showing monoazo and disazo dye structures.)

| No. | Monoazo dye | Disazo dye |
|-----|-------------|------------|
| 19. | 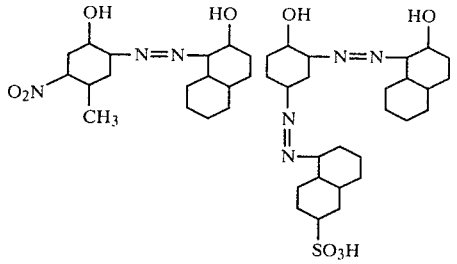 | 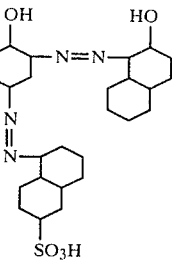 |
| 20. | 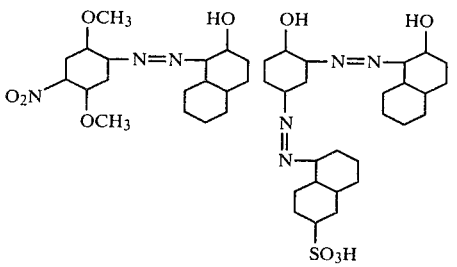 | 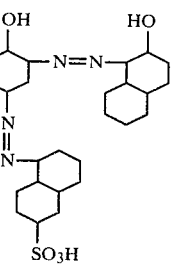 |
| 21. | 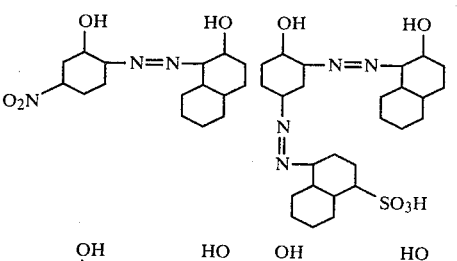 | 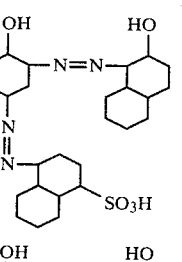 |
| 22. | 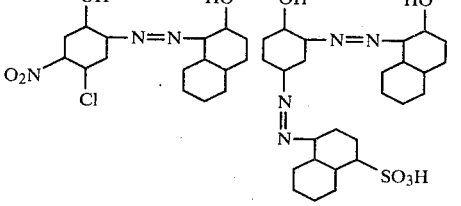 | 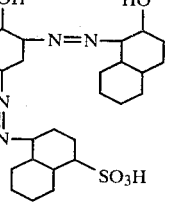 |
| 23. | 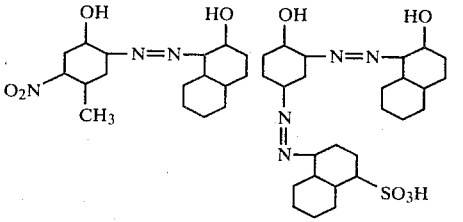 | 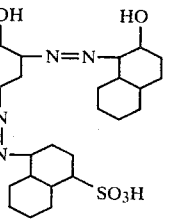 |
| 24. | 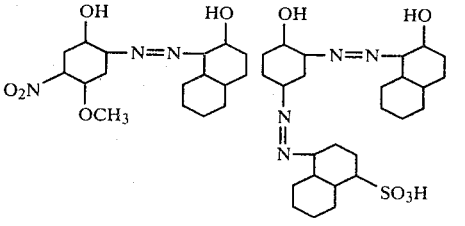 | 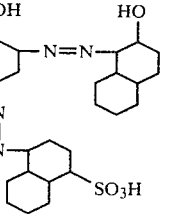 |
| 25. | 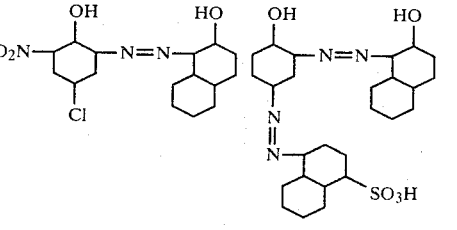 | 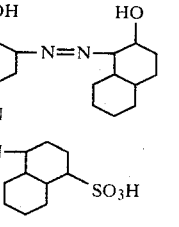 |

| No. | Monoazo dye | Disazo dye |
|---|---|---|
| 26. | 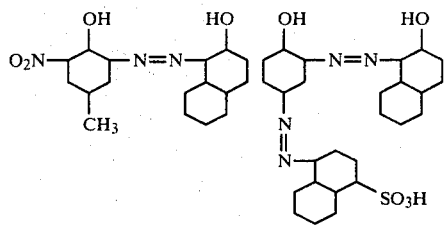 | 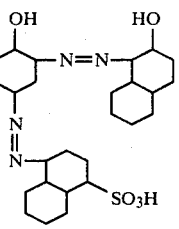 |
| 27. | 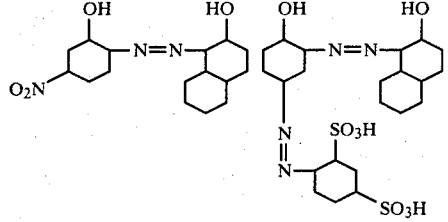 | 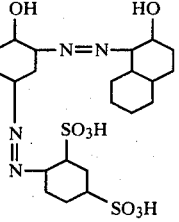 |
| 28. | 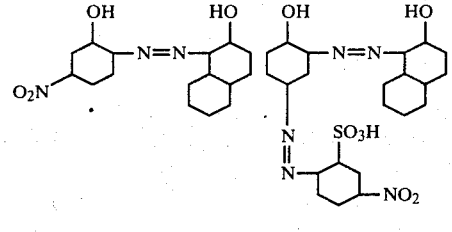 | 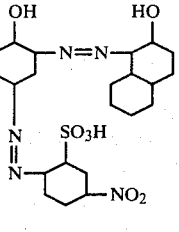 |
| 29. | 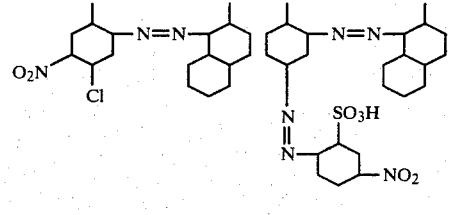 | 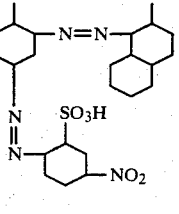 |
| 30. | 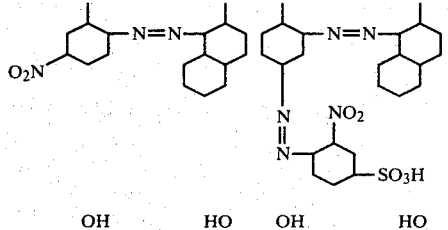 | 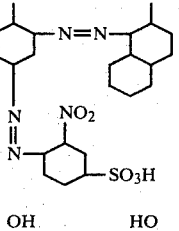 |
| 31. | 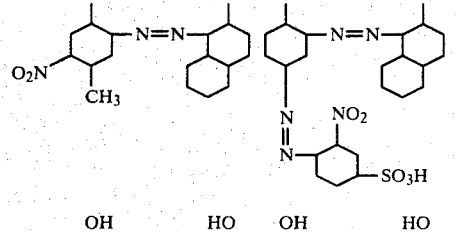 | 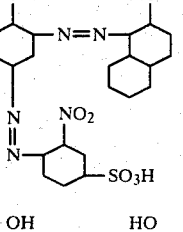 |
| 32. | 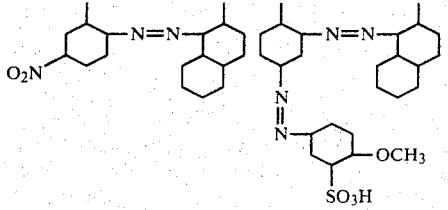 | 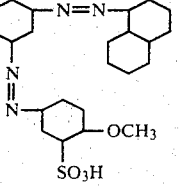 |

| No. | Monoazo dye | Disazo dye |
|---|---|---|
| 33. | 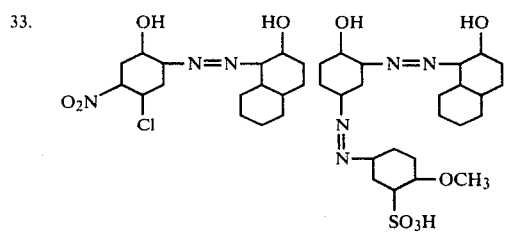 | |
| 34. | 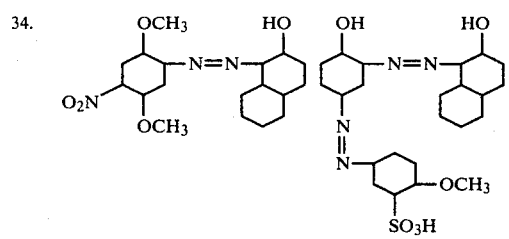 | |
| 35. | 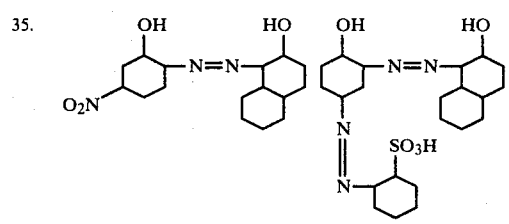 | |
| 36. | 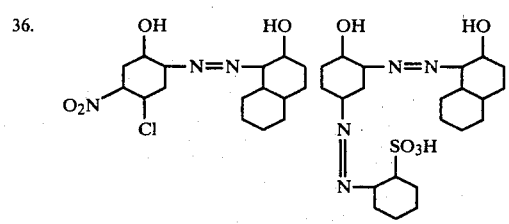 | |
| 37. | 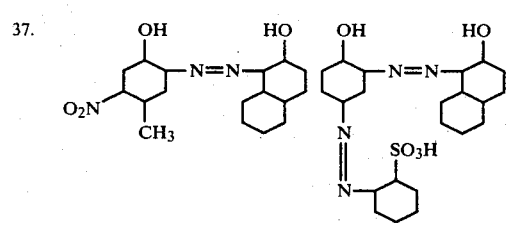 | |
| 38. | 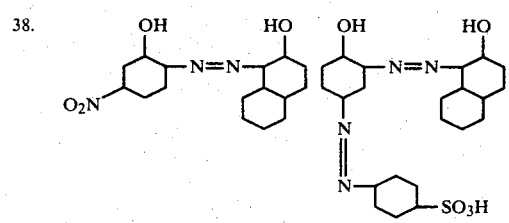 | |
| 39. | 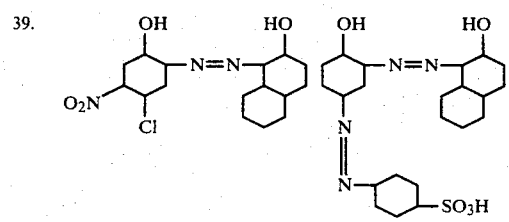 | |

| No. | Monoazo dye | Disazo dye |
|---|---|---|
| 40. | (structure) | (structure) |
| 41. | (structure) | (structure) |
| 42. | (structure) | (structure) |
| 43. | (structure) | (structure) |
| 44. | (structure) | (structure) |
| 45. | (structure) | (structure) |
| 46. | (structure) | (structure) |

-continued

| No. | Monoazo dye | Disazo dye |
|-----|-------------|------------|
| 47. | | |
| 48. | | |
| 49. | | |
| 50. | | |
| 51. | | |
| 52. | | |
| 53. | | |

| No. | Monoazo dye | Disazo dye |
|---|---|---|
| 54. | | |
| 55. | | |
| 56. | | |
| 57. | | |
| 58. | | |
| 59. | | |
| 60. | | |

(Structural formulae for entries 54–60 are shown; each monoazo dye has the pattern 2,4-dinitro-6-hydroxyphenyl–N=N–(1-hydroxy-2-naphthyl), and each disazo dye extends this pattern with additional azo and sulfonated/methylated/methoxylated aromatic groups as illustrated.)

| No. | Monoazo dye | Disazo dye |
|---|---|---|
| 61. | (structure) | (structure) |

Dyeing Procedure for Wool 100 parts of wool yarn are put at 50° C. into a dyebath which contains 2 parts of the dye of Example 2, 4 parts of ammonium sulphate and 2 parts of a levelling agent in 4000 parts of water. The liquor is brought to the boil in the course of 45 minutes and kept thereat for a further 45 minutes. The goods are then removed from the bath, thoroughly rinsed with cold water and dried. A level black dyeing is obtained.

Dyeing Procedure for Leather 100 parts of clothing velours leather (dry weight) are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 6 parts of the dye of Example 1. A solution of 40 parts of water and 4 parts of formic acid (85%) is then added and dyeing is continued for a further 30 minutes. The leather is then thoroughly rinsed and, if appropriate, treated for 30 minutes at 50° C. with 2 parts of a dicyandiamine/formaldehyde condensation product. Other kinds of velour leather as well as glove leather can be dyed black in the same manner.

I claim:

1. A chromium complex dye of the formula

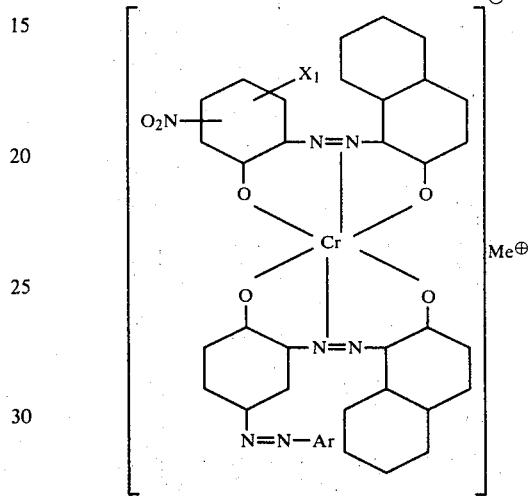

wherein
- $X_1$ is hydrogen, chloro, nitro or methyl;
- $Me^{\oplus}$ is a cation; and
- Ar is phenyl or naphthyl which is substituted by one or two —$SO_3H$ and is further unsubstituted or substituted by $C_1$-$C_5$ alkyl, $C_1$-$C_2$ alkoxy, chloro or nitro.

2. A chromium complex dye according to claim 1, wherein X is hydrogen and the $NO_2$-group is in the para position to the azo group.

3. A chromium complex dye according to claim 1, wherein the $NO_2$-group is in the ortho position to the oxygen atom and $X_1$ is nitro which is in the para position to the oxygen atom.

* * * * *